United States Patent [19]

Behnke et al.

[11] 4,436,839
[45] Mar. 13, 1984

[54] PROCESS FOR PREPARING POLYCARBONATE-POLYETHER-BLOCK-COPOLYMERS

[75] Inventors: Joachim Behnke, Amorbach; Walter Löffelmann, Erlenbach, both of Fed. Rep. of Germany

[73] Assignee: Akzo NV, Arnhem, Netherlands

[21] Appl. No.: 177,463

[22] Filed: Aug. 11, 1980

[30] Foreign Application Priority Data

Aug. 13, 1979 [DE] Fed. Rep. of Germany ....... 2932737

[51] Int. Cl.³ .................... C08G 18/44; C08G 63/68; C08J 9/28
[52] U.S. Cl. .................................... 521/64; 521/180; 528/196; 528/199
[58] Field of Search .................. 528/196, 199; 521/64, 521/180

[56] References Cited

U.S. PATENT DOCUMENTS

| 3,240,755 | 3/1966 | Cawthon et al. | 528/196 |
| 3,787,359 | 1/1974 | Horn et al. | 528/196 |
| 3,945,969 | 3/1976 | Horn et al. | 528/196 |
| 3,974,126 | 8/1976 | Narita et al. | 528/196 |
| 4,160,791 | 7/1979 | Higley et al. | 528/196 |
| 4,205,162 | 5/1980 | Herscovici | 528/196 |
| 4,212,967 | 7/1980 | Govoni et al. | 528/196 |
| 4,252,968 | 2/1981 | Govoni et al. | 528/196 |

OTHER PUBLICATIONS

Goldberg, J. of Polymer Science, Part C, No. 4, pp. 707-730.
Webster's New World Dictionary, College Edition, New York, 1966, p. 1411.

Primary Examiner—H. S. Cockeram
Attorney, Agent, or Firm—Michael J. Striker

[57] ABSTRACT

A method for production of polycarbonate-polyether-blockcopolymers is provided. One or more solutions comprising bisphenol A and polyalkyleneglycol and a phosgene solution are added to a cooled initial reaction medium in a cooled reaction chamber in such a way that the phosgene contacts substantially the reaction partners from the one or more cooled solutions after they have spread in the reaction medium. Preferably the phosgene solution and the one or more solutions are added through tubes ending above the liquid level of the reaction medium such that the solutions added contact only within the stirred reaction mixture the reaction partner. The phosgene is employed in an excess of less than about 10 weight percent of the stochiometrically required weight amount relative to bisphenol A and polyalkyleneglycol. The polymer is useful in the production of membranes for dialysis, ultrafiltration and reverse osmosis.

20 Claims, 3 Drawing Figures

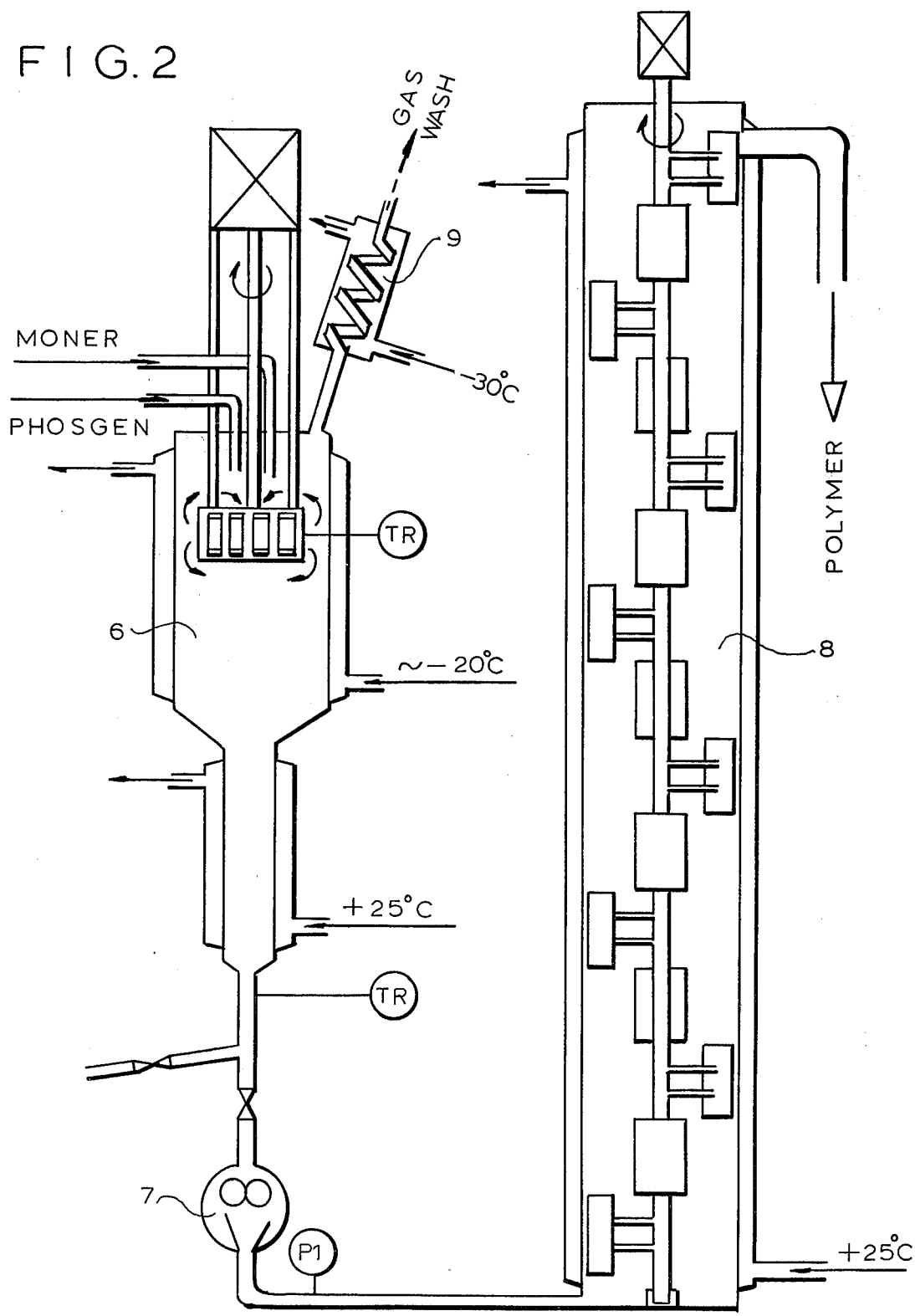

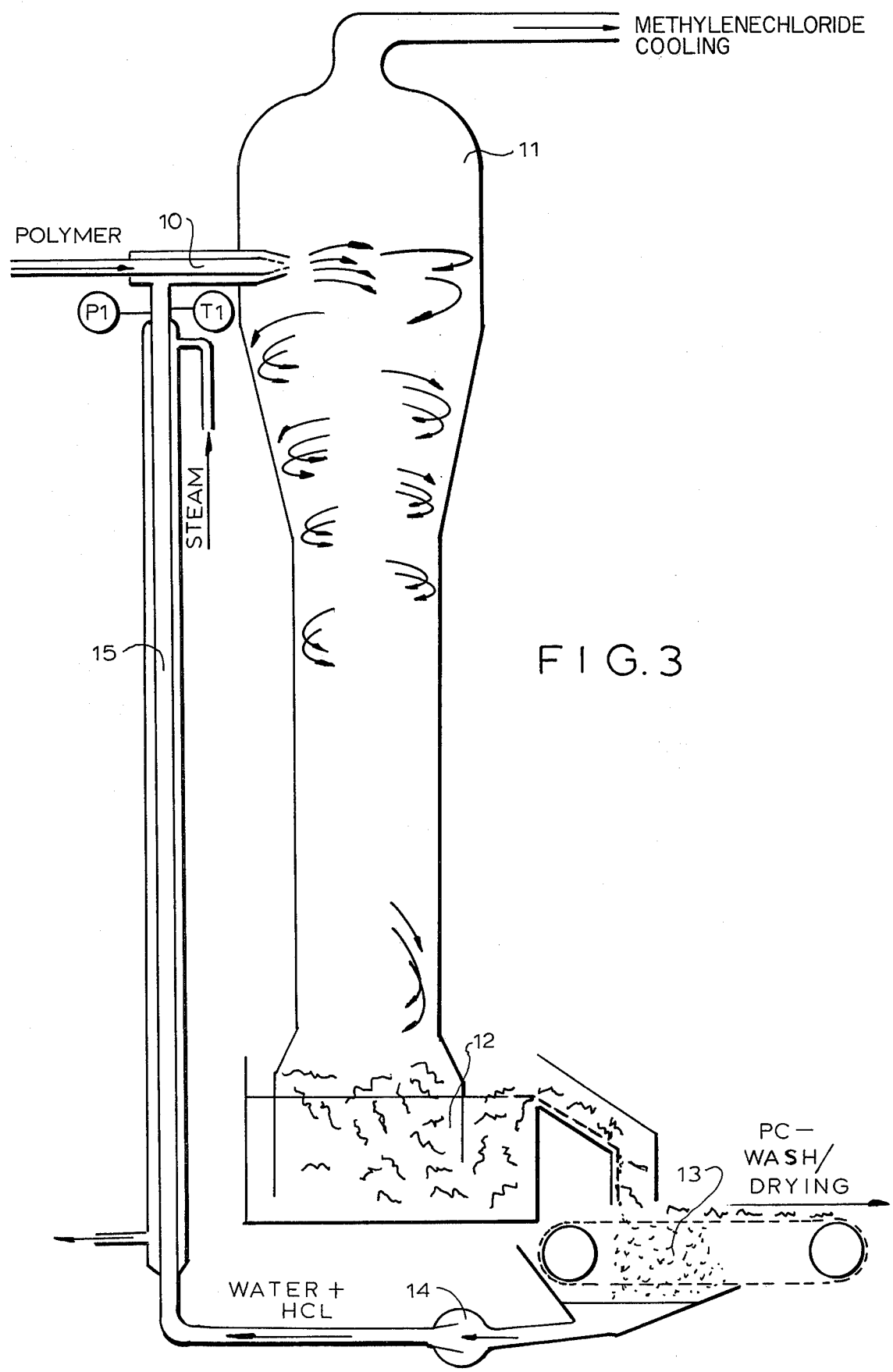

PROCESS FOR PREPARING POLYCARBONATE-POLYETHER-BLOCK-COPOLYMERS

BACKGROUND OF THE INVENTION

1. Field of the Invention

This invention relates to a method for continuous production of polycarbonate-polyether-blockcopolymers.

2. Brief Description of the Background of the Invention Including Prior Art

Goldberg in Journal of Polymer Science, Part C, No. 4, pages 707 to 730 (1963) discloses polyether-polycarbonate-blockcopolymers prepared by reaction of about 95 to 65 weight percent bisphenol A and correspondingly of about 5 to 35 weight percent of a polyethyleneglycol with a corresponding amount of phosgene. Conventionally there were considerable difficulties to prepare such polycarbonate-polyether-blockcopolymers in a continuous process.

The discontinuous interfacial condensation process disclosed in German Offenlegungsschrift DE-OS No. 26 36 784 requires a very large excess of phosgene in order to reach sufficiently large reaction and employs the bisphenol A as its disodium salt. Therefor it was not possible to produce polymers having a relative viscosity of more than about 1.5 dl/g. The work up of the polymers obtained is difficult and requires considerable equipment based on the numerous separation and purification steps.

The preparation of polycarbonates by reacting 4,4'-bioxydiphenylalkanes with phosgene in the presence of pyridine and inert solvents is already disclosed in Angewandte Chemie, Vol. 68, page 635 (1956). As a suitable solvent for polycarbonates methylene chloride has previously been mentioned several times.

SUMMARY OF THE INVENTION

1. Purposes of the Invention

It is an object of the invention to prepare polycarbonate-polyether-blockcopolymers with high molecular weights and with good purity in a continuous process.

It is another object of the present invention to improve a method for production of membranes as are used in dialysis, ultrafiltration or reverse osmosis.

These and other objects and advantages of the present invention will become evident from the description which follows.

2. Brief Description of the Invention

The present invention provides a method for production of polycarbonate-polyether-copolymers which comprises providing a cooled initial reaction medium in a cooled reaction chamber, adding to the reaction medium one or more cooled solutions comprising bisphenol A and polyalkyleneglycol and adding to the reaction medium phosgene in such a way that the phosgene contacts substantially the reaction partners from the one or more cooled solutions after they have spread in the reaction medium. Phosgene is preferably added as a cooled solution and the same solvent can be employed for the phosgene and for the one or more cooled solutions. Preferred solvents include chlorinated hydrocarbons having a melting point below 0° C. such as methylenechloride. The phosgene can be added in an excess of less than about 10 weight percent of the stochiometrically required weight amount relative to bisphenol A and polyalkyleneglycol. In a preferred embodiment the one or more cooled solutions are added through a tube ending above the liquid level of the reaction mixture and the phosgene is added as a cooled solution through a tube ending above the liquid level of the reaction medium such that the solutions added contact only within the stirred reaction mixture the reaction partner.

The resulting highly viscous polycarbonate-polyether-copolymer solution can pass as one stream and warm acidified water as a second stream through a multicomponent nozzle and the liquids can be sprayed into a vessel. Preferably the water is acidified with hydrochloric acid. The solvent can azeotropically be evaporated during the spraying and the precipitated copolymer can be deposited on a wire cloth, a filter or a sieve for purification. Preferably the polymer is precipitated in a form having open pores.

The addition of the reaction components to the reaction chamber can be controlled depending on the kinematic viscosity at the exit point of the reactor. The reaction mixture can be maintained at a temperature from about 24° C. to 35° C. and preferably at a reaction temperature from about 27° C. to 32° C. The polymerization can be carried to an intrinsic viscosity of from about 150 to 300 ml/g as determined in chloroform at 25° C. The weight ratio of the bisphenol A to polyalkyleneglycol can be from about 2.5:1 to 20:1 and the average molecular weight of the polyalkyleneglycol can be from about 1,000 to 20,000. Preferably the one or more cooled solutions and the phosgene are cooled to below 0° C.

The method for production of membranes for dialysis, ultrafiltration or reverse osmosis is improved by preparing as a polymer for the membrane a polycarbonate-polyether-copolymer obtained by providing an initial cooled reaction medium in a reaction chamber, adding to the reaction medium one or more cooled solutions comprising bisphenol A and polyalkyleneglycol and adding to the reaction medium phosgene in such a way that the phosgene contacts substantially the reaction partners from the one or more cooled solutions after they have spread in the reaction medium. The cooled initial reaction medium can be for example just a solvent, a solvent containing phosgene and/or bisphenol A and/or polyalkyleneglycol or a cooled residue from a previous run.

A detailed description of membranes employing polymers related to the present invention is provided in U.S. patent application Ser. No. 177,462, filed Aug. 11, 1980 by Behnke et al. for Polycarbonate-polyether-copolymermembrane, which disclosure is hereby incorporated by reference.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a more detailed representation of the reactor vessel, reflux condenser, pump and delay reactor sequence from FIG. 1.

FIG. 3 is a schematic representation of one embodiment for the working up of the copolymer solution, by spraying through a multi-component nozzle into a vessel under azeotropical evaporation of the solvent.

DESCRIPTION OF INVENTION AND PREFERRED EMBODIMENTS

Figure 1:
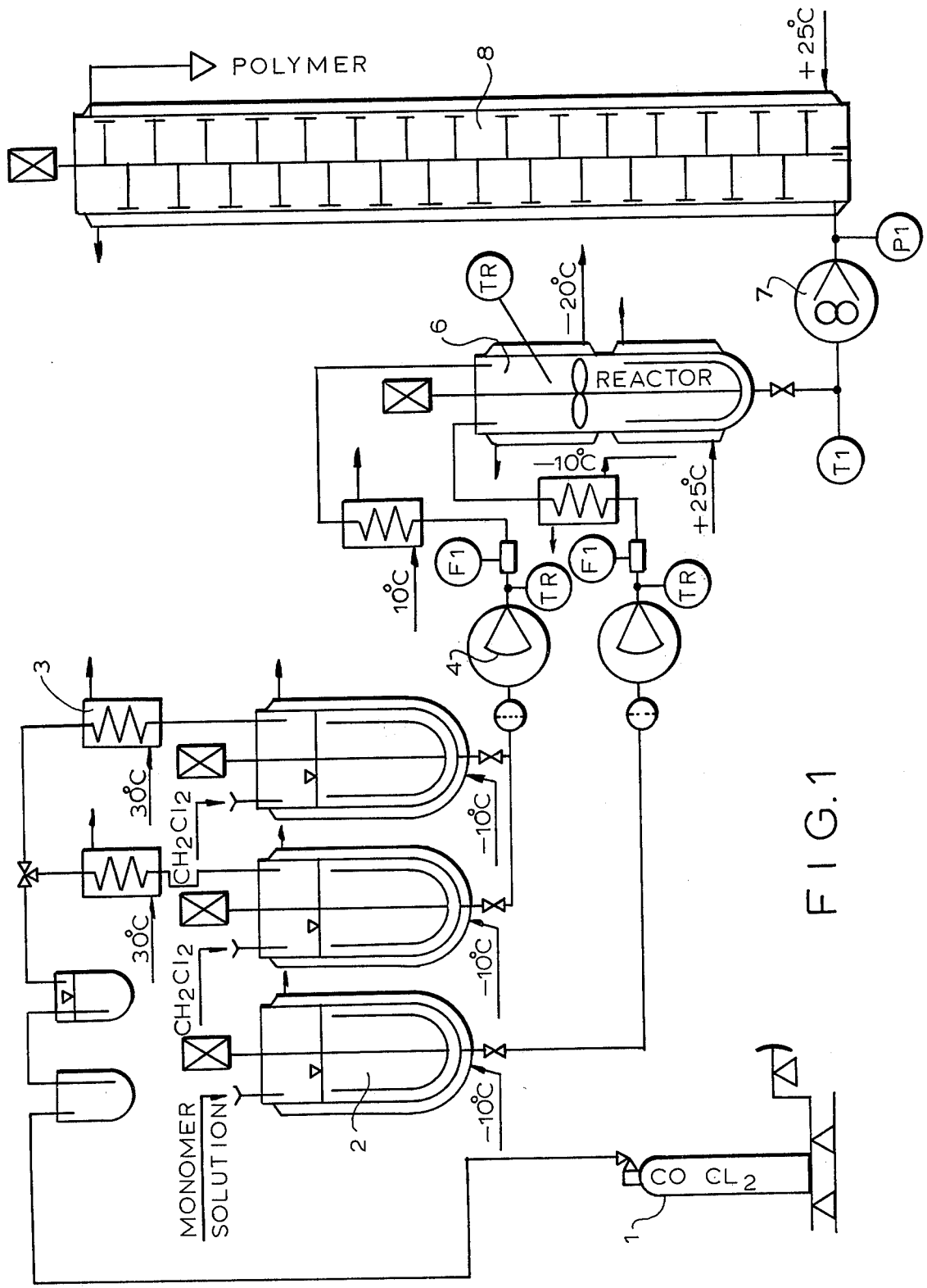
FIG. 1 is a schematically represented flow-chart (with apparatus) of the method for production of polycarbonate-polyether-copolymers.

In accordance with the present invention a cooled solution of bisphenol A, polyalkyleneglycol and pyridine and a cooled solution of phosgene are introduced in a reaction vessel, reference numeral 6 in the Figures, in such amounts that the phosgene is fed with an excess of less than 10 weight percent of the stochiometrically required amount relative to bisphenol A and polyalkyleneglycol. The feeding tubes end above the liquid level of the reaction mixture in such a distance that the solutions flowing out contact with each other only inside of the stirred reaction mixture and react there.

In the discontinuous process a stochiometric excess of at least 20 weight percent of phosgene is required for a successful polycondensation. It has been found that a limitation and accurate maintenance of the stochiometric relation of phosgene to diols is essential for avoiding the production of low molecular weight products and for avoiding considerable nonuniformity.

It is also indispensable to avoid that the reaction partners contact and react already before being contained in the stirred reaction mixture.

Surprisingly it has been found that the resulting polymer solutions can be worked up immediately following the continuous process of the present invention to solvent-free polymer particles in a continuous way. The polycarbonate-polyether-copolymer solution obtained from the poly-condensation is sprayed as one component stream and warm, hydrochloric acid containing water as a second component stream through a multi-component nozzle into a vessel under azeotropical evaporation of the solvent (FIG. 3.). The copolymer is placed onto a wire cloth, filter, sieve or the like and then cleaned on the same. The water solvent ratio and the water temperature are selected preferably such that the polymer precipitates in a form containing open pores which simplifies considerably further purification of the product.

Particularly suited as solvents in the process of the present invention are chlorinated hydrocarbons having a melting point below 0° C., since their solutions can be cooled to low temperatures for fast removal thereby of a large part of the heat of reaction. These solvents dissolve polycarbonate-polyether-copolymers without problem. A preferred solvent for one of the solutions of the present invention is methylene chloride. In order to keep the recovery of the solvents simple, in one embodiment of the invention the same solvent is employed for all solutions of the invention.

Preferred polyalkyleneglycols are those wherein the alkylene part has from 2 to 8 carbon atoms and more preferred are those wherein the alkylene part has from 2 to 4 carbon atoms.

The addition of the solvents to the reactor is preferably controlled by depending on the kinematic viscosity. The reaction time depends on the reactor construction, the reaction temperatures, the solvents and the stirring rate. A preferred reaction time is from about 2 to 10 minutes.

A part of the heat of reaction is removed by cooling the solutions to temperatures below 0° C. By additional cooling from the outside the temperature of the reaction mixture is maintained from about 24° C. to 35° C. Preferably the temperature of the reaction mixture is kept at from about 27° C. to 32° C. Corresponding to the temperature of the reaction mixture a desired degree of polymerization can be selected. Polymerization products with good mechanical properties are obtained when the polymerization is carried to an intrinsic viscosity of the copolymer of from 150 to 300 ml/g. The intrinsic viscosity is measured in chloroform at 25° C.

Important fields of application of the polymers in accordance with the present invention are membranes for dialysis, especially hemodialysis, for ultrafiltration, also for hemofiltration and reverse osmosis such as for example in the desalinization of sea water.

The weight ratio of bisphenol A to polyalkylene glycol is set for such membranes preferably that it is from about 2.5:1 to 20:1. The average molecular weight of the polyalkyleneglycol is preferably from about 1,000 to 20,000, wherein the average molecular weight referred to is the weight average.

The invention is further illustrated by way of the following example.

EXAMPLE

A storage container means 2 in FIG. 1 contains a carefully filtered monomer solution cooled to −10° C. comprising:

9,383.1 g Bisphenol A;
2,613.0 g polyethyleneglycol 6000;
9,855.0 g pyridine; and
56,100.0 g methylene chloride (free of alcohols). The monomer solution is pumped by one of parallel pump means 4 and through one of parallel temperature adjustment means 5 into a reactor 6 at a rate of 49 ml solution per minute, e.g. with a highly accurate metering diaphragm piston pump (error less than 1%) which is well insulated as are all pipe connections. For controlling the constant rate of metering both the temperature of the solution and the amount metered, which is determined with a flow meter, are registered.

Analogously, a solution of
4,929.0 g phosgene, initially from supply means 1 and through temperature adjustment means 3, and
60,000.0 g methylene chloride (free of alcohols) is metered in an amount of 33.6 ml per minute (=about 8 weight percent excess). Two or more parallel systems 2/3 may be used. From these component amounts result about 15 kg of a copolymer of bisphenol A -polycarbonate-polyethyleneglycol with a weight ratio of 80 to 20 in 24 hours. Of course, other copolycondensates can be obtained by changing the monomer composition.

The reactor 6 comprises a cylindrical vessel with a double wall for outside cooling, which is equipped with an intensely effective stirrer (for example a Kotthof mixing sirene). Through the cover of the reactor are fed the stirrer shaft and the two pipes for monomer and phosgene solution. In addition the vessel is provided with a reflux condenser 9 (FIG. 2) cooled to −30° C. and the exit of the condenser is fed to a gas washer.

The pipes of the monomer and phosgene solution are not to be submerged into the reaction solution. Furthermore it is provided that the part streams pass directly into the suck-in zone of the stirrer without mixing already before entering into the reaction solution.

The polymerization occurs with large heat development. The heat generated is removed by outside cooling at such a rate that the temperature in the reaction vessel remains above 24° C. and preferably is from about 27° C. to 32° C. In this way polymerization products were achieved having an intrinsic viscoisty of the coolymer of up to 300 ml/g.

The residing time in the reaction vessel is about 5 minutes. At the drop in area in the reactor, which is filled to only about 80 percent, the yellow color of the pyridine-$COCL_2$-complex is initially observed, which changes however to white only a few centimeters deeper. The reaction solution turns rapidly viscous such that upon exiting from the reactor the kinematic viscosity of the reaction mixture is then about 30 Pa.s.

After leaving the reactor the solution is pumped into a cylindrical delay reactor 8 (FIG. 2) maintained at 25° C. and comprising a slowly rotating stirrer having a geometry for mixing only in a horizontal plane. The total dwelling time in the total condensation system to the exiting of the product out of the delay time reactor amounts to about 45 minutes.

The fully reacted polymer solution is fed into a small buffer container, not illustrated, and from there fed to a continuous precipitation apparatus FIG. 3, which operates as follows:

The polymer solution is pressed through a tube 10, which is provided at its front end with a nozzle having several bores (0.8 mm diameter). The tube is surrounded by a jacket, which is open at about the height of the nozzle and forms there a narrow circular slot resulting in about the picture of a core-jacket-nozzle with several core strands. At the rear end of the jacket, which is sealed with the inner tube with a gland, is located an input connector.

While the polymer solution is pressed through the inner pipe and exits through the nozzle holes, water acidified with hydrochloric acid and from supply conduit means 15 and at a temperature of from about 80° C. to 100° C. is pressed through the jacket. The hydrochloric acid binds excess pyridine in order to prevent that pyridine distills off. The velocity of the water at the exit from the circular slot is much larger compared with the exit velocity of the polymer solution. Since the water temperature is considerably above the boiling point of the methylene chloride of the polymer solution there occurs at the nozzle exit a rapid evaporation of the solvent. The polymer precipitates in the form of short, ripped off fibers. The precipitating lance is disposed in a wide, vertically standing tube 11, which expands upwardly, such that a tangential oncoming flow passes the inner wall of the tube and thus a type of cyclone effect is generated. The polymer-water mixture falls on a spiral path inside of the tube downward into an open catch container 12, the water level of which forms the lower closure of the tube. The container is provided with an overflow.

Polymer and water solution flow over a moving sieve 13 and the aqueous solution is fed again through conduit 15 to the precipitation lance with a pump 14 from the sieve runoff. The system is heated such as to maintain a constant water temperature.

This method of precipitation provides substantial advantages when compared with conventional methods:

1. No organic precipitating medium is required.
2. The solvent is recovered immediately in practically quantitative amounts.
3. The polymer is precipitated in such a loose, open porous form that the following washing length is short. The pyridine has to be removed to less than 10 ppm.
4. The recovery of the pyridine from the aqueous solution is relatively simple: Alkali is added to neutralization and then the solution is extracted with $CH_2Cl_2$, or the pyridine is azeotropically distilled off and the solution is then extracted.

After the precipitation of the polymer the sieve band is washed continuously, sucked off and dried.

The final product has a high degree of purity and is toxicologically satisfactory. Also for this reason it can be employed in hemodialysis and hemofiltration membranes without risk.

What is claimed is:

1. A method for production of polycarbonate-polyether-copolymers comprising
   providing a cooled initial reaction medium in a cooled reaction chamber;
   adding to the reaction medium one or more cooled solutions of bisphenol A and polyalkyleneglycol; and
   adding to the reaction medium a cooled solution of phosgene in excess of less than about 10 weight-% of the stoichiometrically required weight amount relative to bisphenol A and polyalkyleneglycol in such way that the phosgene contacts substantially the reaction partners from the one or more cooled solutions after they have spread in the reaction medium,
   said step of adding being performed in such manner that the one or more cooled solutions are added through a tube ending above the liquid level of the reaction mixture, and the cooled solution of phosgene is added through a tube ending above the liquid level of the reaction medium so that the solutions added contact only within the stirred reaction mixture the reaction partner;
   and isolating the copolymer from the reaction mixture.

2. The method according to claim 1 wherein the same solvent is employed for the phosgene solution and for the one or more cooled solutions.

3. The method according to claim 1 wherein at least one of the solvents is a chlorinated hydrocarbon with a melting point below 0° C.

4. The method according to claim 3 wherein at least one of the solvents is methylenechloride.

5. The method according to claim 1 wherein the one or more reaction solutions are a solution of bisphenol A and polyalkyleneglycol in pyridine.

6. The method according to claim 1 wherein said isolating includes passing the resulting highly viscous polycarbonate-polyethercopolymer solution as one stream and warm, acidified water as a second stream through a multicomponent nozzle; and spraying the liquids into a vessel.

7. The method according to claim 6 wherein the acidified water is an aqueous solution of hydrochloric acid.

8. The method according to claim 6 further comprising azeotropically evaporating the solvent during the spraying.

9. The method according to claim 6, wherein after said spraying the copolymer becomes precipitated and further comprising depositing the precipitated copolymer on a wire cloth for purification.

10. The method according to claim 6, wherein after said spraying the copolymer becomes preciitated and further comprising depositing the precipitated copolymer on a filter for purification.

11. The method according to claim 6, wherein after said spraying the copolymer becomes precipitated and further comprising depositing the precipitated copolymer on a sieve for purification.

12. The method according to claim 6 wherein the copolymer is precipitated in a form having open pores.

13. The method according to claim 1 wherein the addition of the reaction components is controlled depending on the kinematic viscosity at the exit point of the reactor.

14. The method according to claim 1 wherein the temperature of the reaction mixture is maintained at a temperature from about 24° C. to 35° C.

15. The method according to claim 14 wherein the temperature of the reaction mixture is maintained at a temperature from about 27° to 32° C.

16. The method according to claim 1 wherein the polymerization is carried to an intrinsic viscosity of the copolymer of from about 150 to 300 ml/g as determined in chloroform at 25° C.

17. The method according to claim 1 wherein the weight ratio of bisphenol A to polyalkyleneglycol is from about 2.5:1 to 20:1.

18. The method according to claim 1 wherein the average molecular weight of the polyalkyleneglycol is from about 1000 to 20,000.

19. The method according to claim 1 wherein the one or more cooled solutions and the phosgene are cooled to below 0° C.

20. The method according to claim 1 wherein the adding to the reaction medium is a continuous process.

* * * * *